(12) United States Patent
Ben-Bassat

(10) Patent No.: US 9,647,768 B2
(45) Date of Patent: May 9, 2017

(54) MONOLITHIC OPTICAL RECEIVER AND A METHOD FOR MANUFACTURING SAME

(71) Applicant: PLANXWELL LTD., Ganey Tikva (IL)

(72) Inventor: David Ben-Bassat, Ganey Tikva (IL)

(73) Assignee: PLANXWELL LTD., Ganey Tikva (IL)

(*) Notice: Subject to any disclaimer, the term of this patent is extended or adjusted under 35 U.S.C. 154(b) by 29 days.

(21) Appl. No.: 14/647,461

(22) PCT Filed: Nov. 27, 2013

(86) PCT No.: PCT/IL2013/000084
§ 371 (c)(1),
(2) Date: May 27, 2015

(87) PCT Pub. No.: WO2014/083558
PCT Pub. Date: Jun. 5, 2014

(65) Prior Publication Data
US 2015/0326322 A1    Nov. 12, 2015

Related U.S. Application Data

(60) Provisional application No. 61/731,711, filed on Nov. 30, 2012.

(51) Int. Cl.
*H04B 10/00* (2013.01)
*H04B 10/69* (2013.01)
*H01Q 1/24* (2006.01)

(52) U.S. Cl.
CPC ......... *H04B 10/6932* (2013.01); *H01Q 1/248* (2013.01); *Y10T 29/4902* (2015.01)

(58) Field of Classification Search
CPC .. H04B 10/6932; Y10T 29/4902; H01Q 1/248
See application file for complete search history.

(56) References Cited

U.S. PATENT DOCUMENTS

| | | | | |
|---|---|---|---|---|
| 2,065,489 A | * | 12/1936 | Etzrodt | H03G 7/02 333/14 |
| 5,731,691 A | * | 3/1998 | Noto | G01S 13/758 323/220 |
| 6,310,705 B1 | * | 10/2001 | Lee | H04B 1/18 379/56.1 |
| 6,792,171 B2 | | 9/2004 | Hargis et al. | |

(Continued)

FOREIGN PATENT DOCUMENTS

DE   102008008480 A1   8/2009

*Primary Examiner* — Danny Leung
(74) *Attorney, Agent, or Firm* — Browdy and Neimark, PLLC

(57) ABSTRACT

A monolithic Receiver Optical Sub-Assembly (ROSA) device is provided and a method for producing the device. The device comprises: at least one antenna configured to receive optical signals; at least one rectifier configured to rectify electrical signals being electrical representation of the received optical signals and having frequencies within an optical band range; and at least one amplifier, coupled to the rectifier and configured to amplify rectified electrical signals; and wherein the ROSA is also characterized in being a single monolithic device.

7 Claims, 7 Drawing Sheets

(56) References Cited

U.S. PATENT DOCUMENTS

| | | | | |
|---|---|---|---|---|
| 7,248,800 B2* | 7/2007 | Shimada | ............... | H04B 10/69 |
| | | | | 385/15 |
| 8,115,683 B1* | 2/2012 | Stefanakos | ............ | H01Q 1/248 |
| | | | | 136/255 |
| 8,237,151 B2* | 8/2012 | Lochtefeld | .......... | H01L 31/1804 |
| | | | | 257/103 |
| 9,419,538 B2* | 8/2016 | Furmanczyk | ......... | H02M 7/066 |
| 2004/0105627 A1* | 6/2004 | Hargis | ................ | G02B 6/4204 |
| | | | | 385/88 |
| 2004/0222855 A1* | 11/2004 | Seetharaman | .......... | H03F 3/087 |
| | | | | 330/308 |
| 2005/0088728 A1* | 4/2005 | Miyazaki | ............... | B82Y 20/00 |
| | | | | 359/344 |
| 2005/0175350 A1* | 8/2005 | Hartzell | ............... | G02B 6/4246 |
| | | | | 398/135 |
| 2006/0076473 A1* | 4/2006 | Wilcken | ............. | H04B 10/1121 |
| | | | | 250/214 A |
| 2008/0100491 A1* | 5/2008 | Umeda | ............. | G06K 19/0701 |
| | | | | 341/176 |
| 2009/0246905 A1* | 10/2009 | Badehi | .................... | G02B 6/10 |
| | | | | 438/65 |
| 2010/0141051 A1* | 6/2010 | Vollaire | ................. | H02J 17/00 |
| | | | | 307/151 |
| 2010/0303476 A1* | 12/2010 | Barton | ................ | H04B 10/505 |
| | | | | 398/212 |
| 2013/0087788 A1* | 4/2013 | Nakamura | ............. | H01L 22/14 |
| | | | | 257/48 |
| 2014/0070351 A1* | 3/2014 | Masuyama | ....... | H01L 31/02325 |
| | | | | 257/432 |
| 2015/0326322 A1* | 11/2015 | Ben-Bassat | ............ | H01Q 1/248 |
| | | | | 398/208 |

* cited by examiner

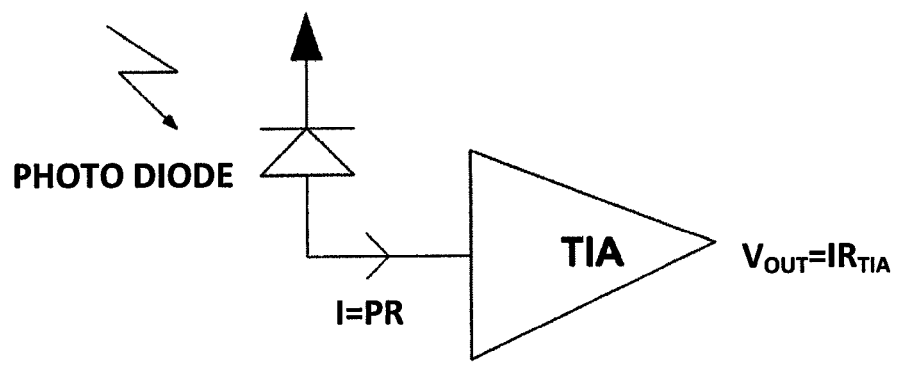
FIG. 1 – PRIOR ART
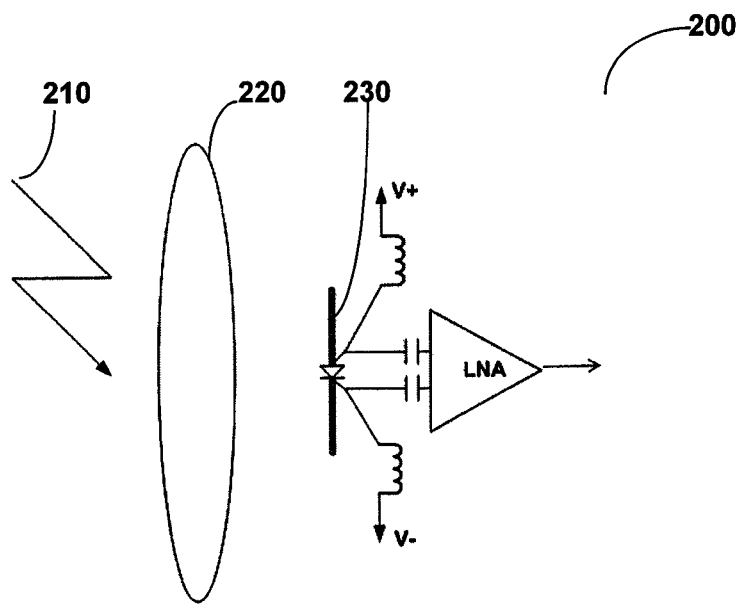
FIG. 2
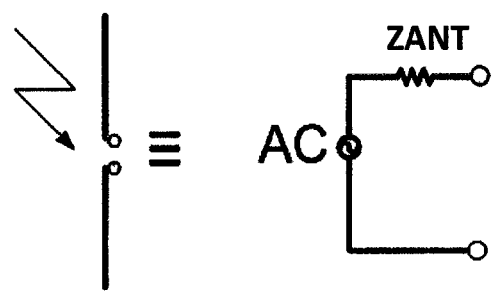
FIG. 3

US 9,647,768 B2

MONOLITHIC OPTICAL RECEIVER AND A METHOD FOR MANUFACTURING SAME

TECHNICAL FIELD

Embodiments of the present disclosure generally relate to the field of devices for optical communications. More particularly, embodiments of the present disclosure relate to receivers for optical signals and methods for manufacturing them.

BACKGROUND

Optical technology is increasingly employed as a technology wherein information can be reliably transmitted via a communications network. Networks employing optical technology are referred to as optical communications networks, and are characterized by having high bandwidth and reliable high-speed data transmission.

Optical modules are electronic components that are configured to convert electrical signals to optical signals and vise versa. Optical modules are classified as LD (Laser Diode) modules and PD (Photodiode) modules. Optical transceivers are packaged PD and LD modules. These products are the core devices for any optical communication system such as an optical transponder and an ONU (Optical Network Unit).

Optical modules are divided into several types. One type is known as receptacle modules. This type is represented by a TOSA (Transmitter Optical Sub-Assembly) and ROSA (Receiver Optical Sub-Assembly) Assemblies. Receiver Optical Sub-Assemblies (referred to hereinafter as "ROSA") are fundamental building blocks in optical communications systems. A ROSA unit is the front end physical layer of an optical receiver—it converts the optical information (i.e. the modulated light) into electrical information (i.e. voltage or current signals). The receiver optical sub-assembly, or ROSA, houses a photo-detector and communicates with a post-amplifier, as well as other devices mounted on a PCB in the module housing. Typically, the ROSA also connects with an optical fiber to allow incoming optical signals to be properly coupled into the ROSA. The housing of the ROSA (or of a ROSA/TOSA transceiver) module provides various functions, including mechanical stability and strength, maintenance of the proper positioning of the ROSA (and TOSA in case of a transceiver), electromagnetic interference containment, electrical connection to the host device, and physical containment and protection for the ROSA, TOSA, PCB, and the devices on the PCB.

An example of such a prior art sub-assembly 100 is illustrated in FIG. 1. The optical signal reaches the reverse-biased photodiode 110 that converts the photonic flux (i.e. optical signal) into electrical current, which in turn is linearly proportional to the photonic flux power. The current generated by the photodiode is fed directly into a Trans-Impedance Amplifier ("TIA") 120. Typically, a TIA is an integrated circuit ("IC") that functions as a current-to-voltage amplifier. However, such existing solutions have several drawbacks, among which are the following ones.

The technologies used to manufacture a photodiode are different from the technologies used to manufacture a TIA. Consequentially, An assembly process is required, in order to combine the two (or more) devices into a single sub-assembly. This process is cumbersome and costly;

The assembly adds parasitic consumers of the generated electric current, which in turn limit the band width of the ROSA. In addition, these parasitic consumers adversely affect the device by making it more sensitive to Electro-Magnetic Interference (EMI) and Radio Frequency Interference (EFI);

It can be shown that the overall self-generated noise of the ROSA is much higher than thermal noise. Dark current noise generated by the photodiode, combined with input referred current noise generated by the TIA form a noise floor that is −40 dB higher than the thermal noise. In other words, a typical solution would be −40 dB worse than the optimal theoretical solution.

As discussed above, one of the drawbacks associated with the manufacturing of a ROSA is the need to combine the individual devices comprising the sub-assembly, into a single unit. U.S. Pat. No. 6,792,171 describes one example of processes that are involved in manufacturing such a ROSA. The ROSA according to this publication includes a stacked chip design of a semiconductor micro-bench, upon which the photodiode and trans-impedance amplifier are mounted. A flexible electrical connector is attached to the semiconductor micro-bench for electrically connecting the ROSA to a host transceiver device. The flexible electrical connector is fixed to the surface of the semiconductor micro-bench with portions cut-out to receive the amplifier and other electrical components extending therefrom. To facilitate assembly, wells need to be etched from the semiconductor micro-bench, which would correspond to bumps extending from a mounting flange for the optical coupler.

However, with the rapid growth of the optical communication market, the need for improved ROSA technologies increases. The present invention seeks to provide a solution to such a need.

SUMMARY

The disclosure may be summarized by referring to the appended claims.

In view of the deficiency of conventional methods it is an object of the present disclosure to provide an improved ROSA device and a method for manufacturing same.

It is another object of the disclosure to provide a ROSA device configured to receive optical signals by electromagnetic means.

It is another object to provide a ROSA device which offers cheaper, smaller, lower power consumption and better performance than compared to prior art devices.

Other objects of the present disclosure will become apparent from the following description.

According to one embodiment, there is provided a monolithic Receiver Optical Sub-Assembly (ROSA) device, comprising:

a. at least one antenna configured to receive optical signals (e.g. signals that were transmitted in free space, signals that were conveyed via a wave guide such as an optical fiber, and the like);

b. at least one rectifier (e.g. coupled to the antenna feed point) configured to rectify electrical signals having frequencies within optical band range. Preferably, the at least one rectifier receives the electrical signals (which are essentially electrical representation of the received optical signals), and rectifies them; and c. at least one amplifier, coupled to the rectifier and configured to amplify rectified electrical signals; and wherein the ROSA is further characterized in being a single monolithic device.

By yet another embodiment, a load of the at least one rectifier is configured to impedance match the respective at least one antenna, in order to enable maximum transfer of power from the at least one antenna to the at least one rectifier load.

In accordance with still another embodiment, the at least one rectifier has a nonlinear electrical response based on a tunnel effect.

According to another embodiment, the monolithic ROSA device further comprises coupling means configured to enable joining an optical concentrating device to the antenna.

According to another aspect of the disclosure, a method is provided for producing a monolithic Receiver Optical Sub-Assembly (ROSA) device that comprises an antenna and an amplifier, wherein the method comprises the steps of:

(i) providing a first layer that comprises a plurality of amplifiers embedded (e.g. deposited) onto a substrate;

(ii) preparing a second layer that comprises a plurality of antennas and a plurality of rectifiers, each of the rectifiers is electrically connected to a respective amplifier thereby obtaining a plurality of dies, wherein each die comprising an amplifier, at least one rectifier and at least one antenna coupled thereto, thus obtaining a plurality of monolithic ROSA devices deposited on a substrate; and (iii) separating between the plurality of ROSA devices deposited onto the substrate, into individual monolithic ROSA devices.

By yet another embodiment, the method further comprises a step of preparing a layer that comprises a plurality of optical concentrating devices, each configured to enable concentrating optical signals that are free spaced transmitted to one or more antennas, and wherein each of the plurality of optical concentrating devices is coupled to a respective antenna. Such an optical concentrating device may either be an external to the monolithic ROSA, or be part thereof.

According to still another embodiment, the method further comprises a step of placing the plurality of antennas at the second layer wherein each of said plurality of antennas is coupled to a respective optical fiber.

By still another embodiment, the method further comprises a step of coupling each of the plurality of antennas to a respective wave guide for placing same at the second layer.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

FIG. 1 is a schematic representation of a prior art configuration of a ROSA device;

FIG. 2 is a schematic illustration of a the ROSA device according to some embodiments;

FIG. 3 illustrates an equivalent schematic representation of the antenna component, in a form of an electric circuit;

DESCRIPTION OF EXEMPLARY EMBODIMENTS

Figure 4:
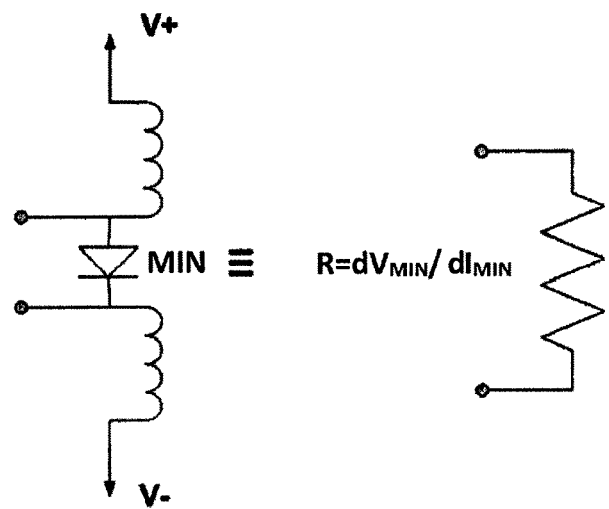
FIG. 4 illustrates equivalent schematic representation of the MIM rectifying load with the DC bias circuit.

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps, not all of which are required in all embodiments of the invention. The scope of the invention can be summarized by referring to the appended claims.

An exploded view of the components included in an exemplary ROSA device 200 construed in accordance with an embodiment of the disclosure, is illustrated in FIG. 2. An electromagnetic signal (designated by 210) arrives via a concentrating (focusing) device 220 (which could be an auxiliary device rather than a part of the ROSA device), to antenna 230, located in this example at the focal point of concentrating device 220. The purpose of having the optional concentrating device is to concentrate as much of the arriving optical signal as possible onto the effective reception area of the antenna. Such a concentrating device can be a lens, a taper or any other type of an optical concentrating element which is applicable for such a task.

The antenna is used to convert the arriving electromagnetic signal (which arrives in the form of light) into electrical signal. The antenna element may be in a form of a single antenna, or in the alternative, a number of antennas connected together to form an antenna array.

The received optical signals have a typical wavelength in the range of 850 to 1550 nm, hence the antenna's dimensions should preferably be of the same order of magnitude. Such dimensions dictate specific production processes and materials. The antenna will preferably be patterned in e-beam or Deep Ultra Violet (DUV) photo lithography, and manufactured by applying Physical Vapor Deposition (PVD) technology. Yet, other patterning and manufacturing technologies could also be implemented, all without departing from the scope of the present disclosure. In addition, the right material for the antenna should be selected, taking into account its conductivity and refractive index when designing the antenna. Selecting a wrong material might result in an antenna having a poor efficiency. For operating the antenna at such high frequencies, materials such as gold, aluminum and silver could be considered as possible options.

The arriving optical signal is received at the antenna where its electromagnetic (optical) energy is picked and converted into electrical form. At the antenna port, the electrical power is harvested with an impedance-matched load. This electrical power is received at operating frequencies of the order of magnitude of hundreds of THz (e.g. 200-300 THz), depending on the wavelength at which the optical signal was received. FIG. 3 illustrates an equivalent schematic representation of the antenna component (shown at the left hand-side of FIG. 3) in a form of an electric circuit (shown at the right hand-side of FIG. 3).

$Z_{ant}(f)$ is a complex impedance, representing the antenna impedance. If the antenna is loaded with a load $Z_{load}(f)$ that is the complex conjugate of the antenna impedance $Z_{ant}(f)$, i.e. $Z_{load}(f)=Z_{ant}*(f)$, than maximum power could be transferred from the antenna to the load.

As common practice in radio engineering, antenna arrays can also be implemented according to some embodiments of the disclosure. Typical antenna arrays are arranged in predefined offsets, and are inter-connected by impedance matched wave guides that can enhance the antenna performance.

By loading the antenna port with a matched non-linear load, rectification will occur. The result will be a DC electrical signal, which is proportional to the power at which the optical signal was received by the antenna. A rectifying element that operates well within the band of about 200-300 THz may be based on quantum physics phenomena known as tunneling. Tunneling effect is a non-linear phenomenon that occurs within femto-seconds. It is the base of a high-speed rectifier being referred to as Metal Insulator Metal (hereinafter "MIM"). MIM type rectifiers have been studied extensively, and were proven to function well as femtosecond rectifiers. Various topologies of MIM are possible, including (but not limited to) lumped, distributed and lumped-and-distributed hybrid solutions. Primary objective is to minimize or cancel out the parasitic capacitance that is an inherent part of a MIM structure. Cancelling parasitic capacitance allows obtaining a better impedance matching to the antenna source impedance. Other rectifying techniques (e.g. full bridge rectification) are also applicable, and should be regarded as being encompassed within the scope of this disclosure.

Rectification quality (defined as the ratio between the output power of the rectified DC signal and the input power of the optical signal) is related to non-linearity of the NIM. MIM elements exhibit different non-linearity in different DC bias points. Therefore, a DC circuit is used to bias the MIM element to an optimal rectification point. An equivalent schematic representation of the MIM rectifying load with the DC bias circuit is illustrated in FIG. 4. The series inductors shown in this FIG. 4 serve as RF chokes, to block the high frequency signal from leaking away from the MIM. Although the above description relates to the use of a single rectifier, it should be noted that other embodiments of the disclosure include rectifier arrays. An array of rectifiers can be considered for example in case of an array of antennas, where each antenna is coupled to its own rectifier, and the rectified signal is connected as required to enhance the ratio of the sensor signal to noise. Rectifiers may be connected to each other in series, in parallel or any combination thereof according to various ROSA requirements.

Figure 5:
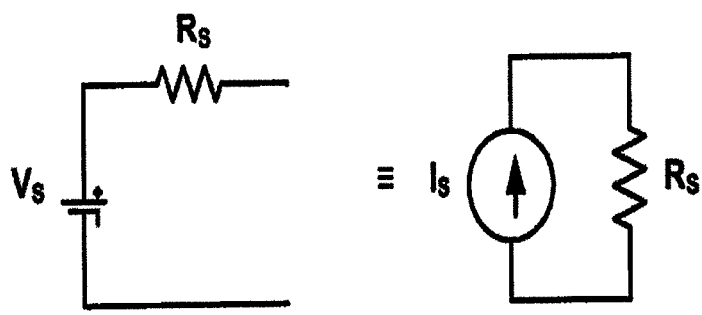
FIG. 5 presents a DC electrical model of a rectified signal.

In addition, according to an embodiment of the disclosure, the ROSA may further comprise an amplifier to amplify the rectified signal generated across the MIM port as a result of the rectification. Amplification is preferred in order to obtain more significant signal levels. The rectified signal source across the MIM port can be modeled as a voltage source with a series resistor—the resistor being the MIM differential resistance. The DC electrical model of the rectified signal is presented in FIG. 5. It can be a voltage source with series of output resistance $R_S$, or alternatively, a current source with parallel output resistance $R_S$. In both alternatives, output resistance $R_S$ is denoted as the small-signal resistance of the MIM rectifier at the bias point: $RS = dV_{MIM}/dI_{MIM}|V_{MIM}$.

For optimal amplification, it is preferred that the input-referred noise as generated by the amplifier is kept minimal. A wide band RF Low Noise Amplifier ("LNA") may be suitable for such a purpose. However, other amplifiers such as voltage amplifiers, current amplifiers, voltage to current trans admittance amplifiers and current to voltage trans impedance amplifiers may also be applicable, and thus should be considered to be part of the scope of this disclosure.

Figure 6:
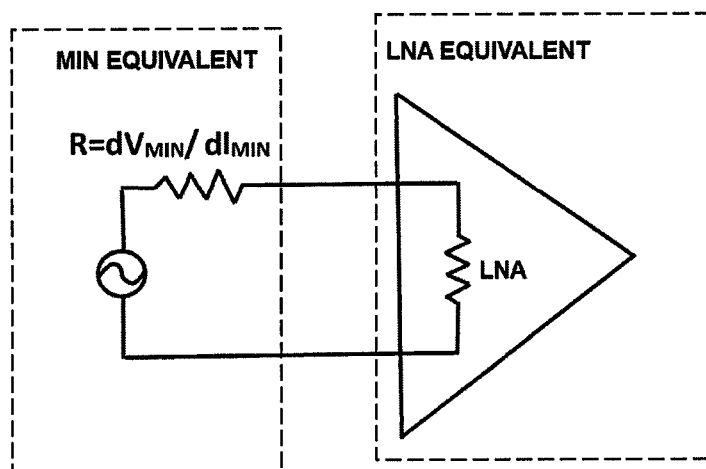
FIG. 6 illustrates an equivalent schematic representation of a MIM output voltage with the low noise amplifier circuit.

An equivalent schematic representation of the MIM output voltage with the LNA circuit is illustrated in FIG. 6.

Next is an example of a manufacturing process for obtaining a monolithic ROSA device according to an embodiment of the present disclosure.

Step 1: Preparing the LNA (Low Noise Amplifier) Layer

First, a silicon wafer is processed to yield a plurality of LNA units. LNA is typically a transistor based voltage or current amplifier, having well-known topologies and design rules. One of the main properties of a LNA is its ability to amplify electrical signals without making a significant change in the signal-to-noise ratio (SNR). A single silicon wafer is suitable for preparing many LNA units, where their number is determined by the wafer dimensions, the single LNA die dimensions and processing design rules.

Step 2: Preparing the Antenna Layer

On top of the wafer LNA's layer, an antenna layer is prepared by applying lithography and Physical Vapor Deposition techniques thereto. Each antenna in that layer is electrically connected to a respective rectifier, which in turn is electrically connected to a respective LNA via two contact pads and is monolithically coupled to the LNA, thereby creating a plurality of dies each comprising a monolithic ROSA device.

Step 3 (Optional): Concentrating Element Deposition

In order to improve the ROSA performance, a concentrating device configured to concentrate the optical signal that arrives to the ROSA, such as lens or taper, may be coupled on top of the antenna. The concentrating device is directed to increase the arriving optical signal onto a smaller antenna area, thereby increasing the optical flux that reaches the effective reception area of the antenna, and consequently, improving the ROSA sensitivity.

Step 4: Singulation

Upon completing the manufacturing process of the wafer containing the LNAs and antennas (with or without the concentrating device) dies, the wafer undergoes a step which is referred to as die cutting, dicing or singulation, for reducing a wafer containing multiple identical ROSA devices to individual dies, each containing one of those monolithic ROSA devices. During this step, the wafer with up to thousands of ROSA circuits is cut into rectangular pieces, each called a die. In between those functional parts of the circuits, a thin non-functional spacing is preferably foreseen where a saw can safely cut the wafer without damaging the circuits. This spacing is usually referred to as "scribe line" or "saw street". The width of the scribe line is very small, typically around 100 μm. A very thin and accurate saw is therefore used to cut the wafer into pieces. Means other than dicing can be used as applicable to carry out this singulation step, and therefore should be considered as being encompassed by the present disclosure.

Figure 7:
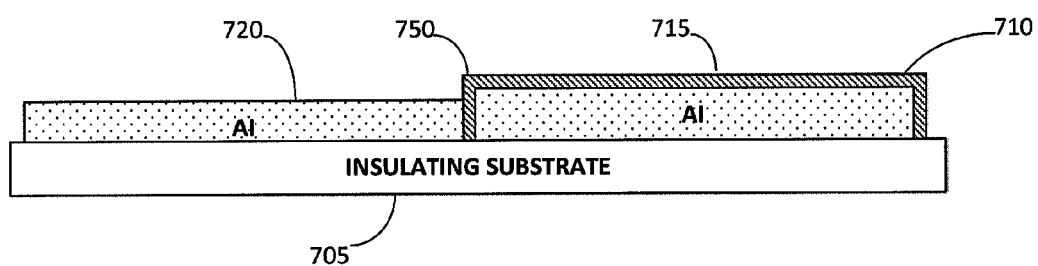
FIG. 7 demonstrates a metal-insulator-metal structure for preparing a wafer in the process of manufacturing ROSA devices.

FIG. 7 illustrates a metal-insulator-metal structure for preparing a wafer comprising a plurality of LNAs and antennas dies, so that once the manufacturing process is completed, it can undergo a step of singulation. For preparing the structure, a thin-film aluminum layer (710) is deposited onto an insulating substrate layer (705). Then, the external surface of the aluminum layer is oxidized to obtain an $Al_2O_3$ insulating layer (715), having a thickness of about 20 Å. Thereafter, another thin-film aluminum layer (720) is deposited, thus creating a metal-insulator-metal structure having a metal-insulator-metal junction (725). This MIM structure (Metal-Insulator-Metal, which is in this case, Aluminum-Aluminum Oxide-Aluminum) serves as the rectifying element. It is placed at the feed point of the antenna, and designed to electrically match the antenna impedance. When the signal received by the antennas passes through the MIM, it is rectified due to the non-linear I(V) curve of the MIM.

FIGS. 8A to 8F represent steps in a manufacturing process according to an embodiment of the disclosure, demonstrated for a single monolithic ROSA device from among the plurality of devices being manufactured by using the same wafer.

Figure 8A:
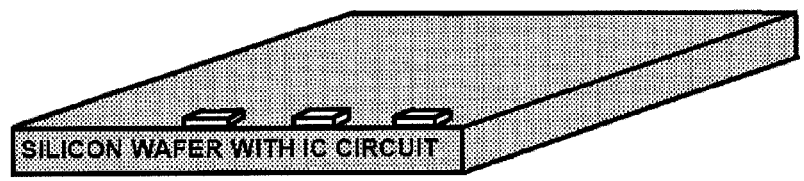
FIGS. 8A to 8F represent steps in a manufacturing process carried out according to an embodiment of the disclosure.

FIG. 8A illustrates the first step of the exemplified process, starting with a standard IC silicon wafer comprising an array of amplifiers, one of which is demonstrated in the following steps of the process.

Figure 8B:
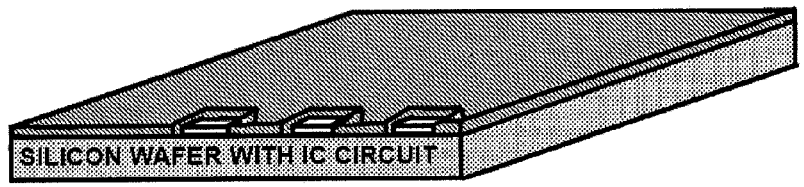

FIG. 8B illustrates the next step wherein a reflective metal is deposited onto the entire area so that this layer may serve as a reflector for the antenna of the ROSA device. The reflective material may be selected from among a group comprising gold, silver, aluminum and the like.

Figure 8C:
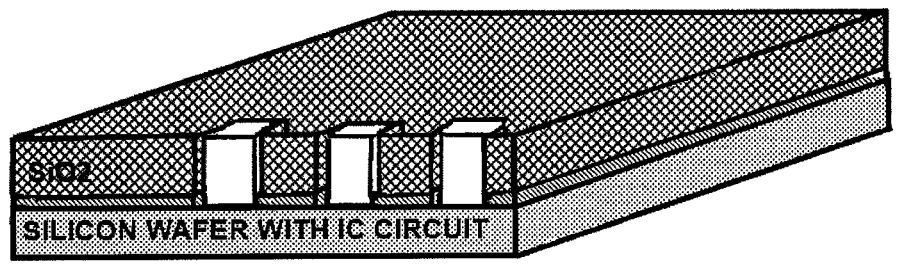

Next, FIG. 8C illustrates the outcome of a coating step where the entire area is coated with silica oxide or ZnS (with a thin layer of $SiO_2$ evaporated thereon for adhesive reasons) having a preferred equivalent oxide thickness (being a distance, usually given in nanometers (nm), which indicates how thick a silicon oxide film would need to be to produce the same effect as when a high-k material is being used) of about ¼ of the wavelength at which the antenna of the ROSA device is expected to receive the optical signals. For example, this insulation layer may be at the range of about 250 nm in order to allow electromagnetic waves, having a wavelength of about 1 μm, to resonate within the insulation layer. While carrying out this coating step, attention should be given to leave enough room so as to allow electrical contact between the pads to the sensor (antenna). An example of such a case could be using a 100 nm aluminum layer deposited onto the Si wafer. On top of that layer, a layer of 100 nm of $SiO_2$. Implementing this step enables to obtain a quarter-wavelength buffer, which serves as part of a standing wave element, for enhancing antenna performance.

Figure 8D:
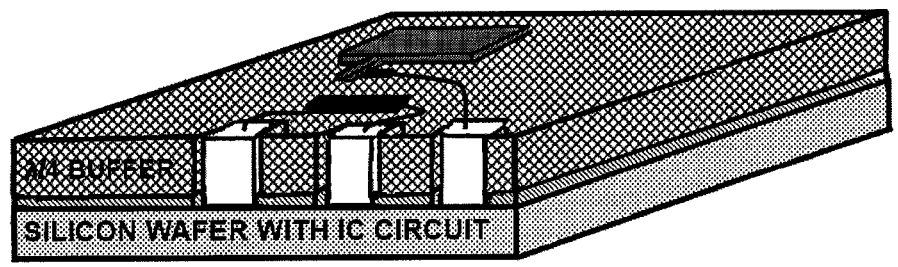

FIG. 8D illustrates the step of evaporation (for the antenna and rectifiers), following the step of preparing the conductive plugs. There are many types of planar antenna topologies that may be considered for producing the ROSA devices, such as log periodic and bowtie antennas. For this step one may use for example a thin gold film having preferably a thickness higher than 60 nm.

Figure 8E:
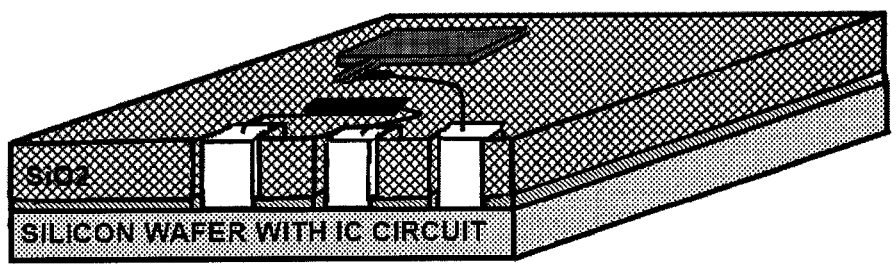
Figure 8F:
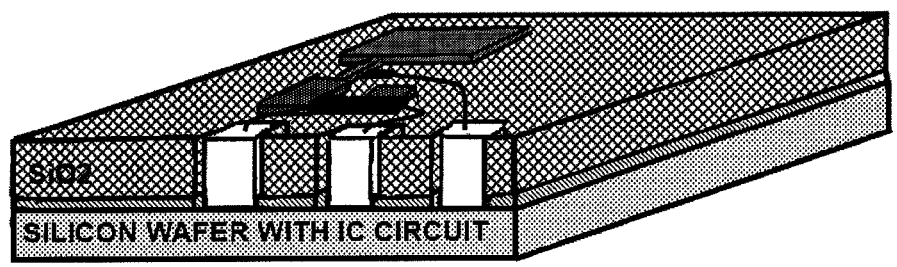

FIG. 8E illustrates a step of oxidizing the antenna and rectifiers to create a thin insulating layer, followed by another iteration of metal deposition illustrated in FIG. 8F, to form a NIM junction and a DC capacitor.

FIGS. 9A to 9D illustrate several examples of connecting various components within the monolithic ROSA device, which are encompassed by various embodiments of the present disclosure.

Figure 9A:
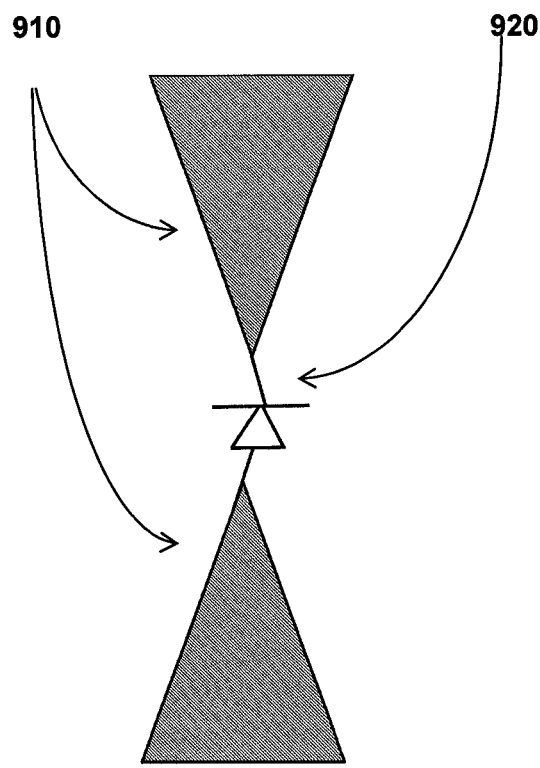
FIGS. 9A to 9D illustrate several examples of connecting various elements within a monolithic ROSA device.

FIG. 9A illustrates an example of a connection extending between the antenna and the rectifier, where elements 910 represent the antenna arms and 920 is the rectifier.

Figure 9B:
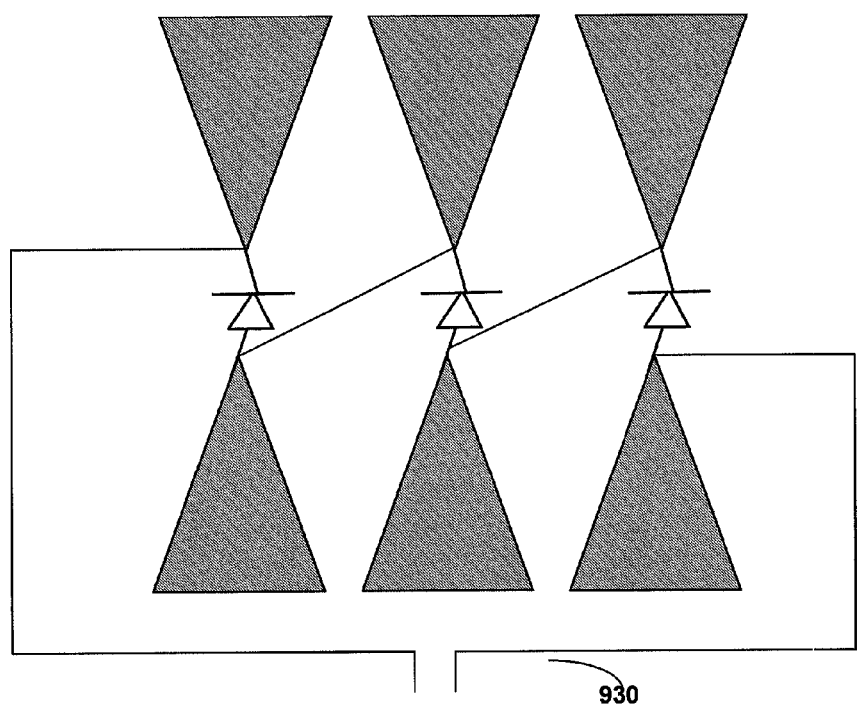

FIG. 9B illustrates an example of a serial connection of a number of antennas and their respective rectifiers to a single amplifier (LNA) 930.

Figure 9C:
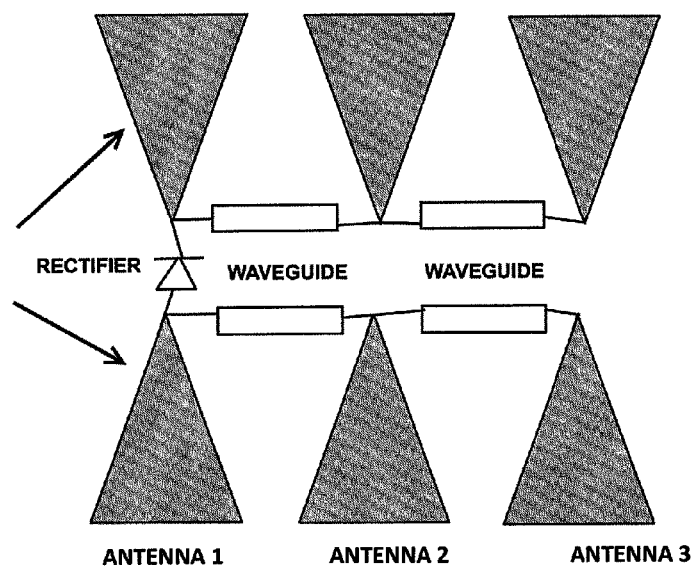

FIG. 9C illustrates another embodiment where a number of antennas are connected to each other via waveguides to a single rectifier, thereby combining the power of the optical signals received by a number of antenna into a single electrical signal by using the single rectifier.

Figure 9D:
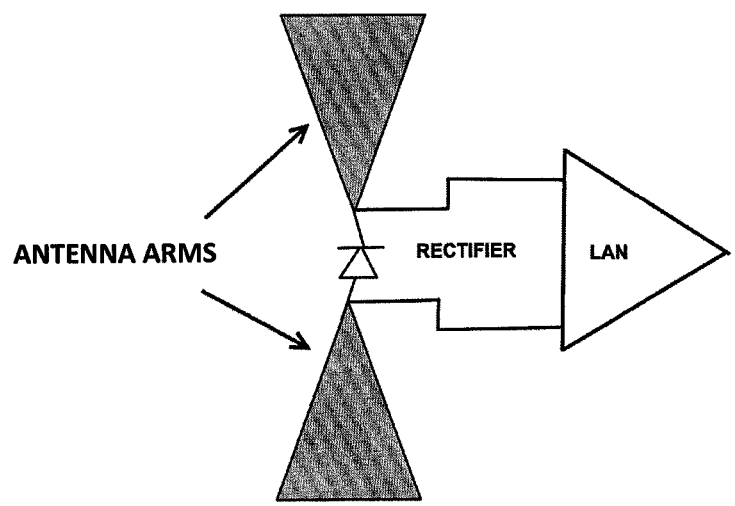

FIG. 9D illustrates yet another embodiment where a single antenna is associated with a single rectifier which in turn is connected to a single amplifier.

Other embodiments of the invention will be apparent to those skilled in the art from consideration of the specification and practice of the invention disclosed herein, for example cases where the optical signals are conveyed to the antenna via a waveguide/optical fiber in the addition or in the alternative of being conveyed in free space. It is intended that the specification and examples be considered as exemplary only, with a true scope and spirit of the invention being indicated by the following claims.

What is claimed is:

1. A monolithic Receiver Optical Sub-Assembly (ROSA) device, comprising:
    a. at least one antenna configured to receive optical signals;
    b. at least one rectifier configured to rectify electrical signals being electrical representation of the received optical signals and having frequencies within an optical band range; and
    c. at least one amplifier, coupled to the rectifier and configured to amplify rectified electrical signals; and
    wherein the ROSA is further characterized in being a single monolithic device, and that it comprises a first layer that comprises the at least one amplifier embedded onto a substrate, and a second layer that comprises at least one antenna and at least one rectifier, where each of the at least one rectifier is electrically connected to a respective amplifier, thereby said ROSA includes a die that comprises an amplifier, a rectifier and at least one antenna coupled thereto.

2. The monolithic ROSA device of claim 1, wherein a load of said rectifier is configured to impedance match the antenna.

3. The monolithic ROSA device of claim 1, wherein the rectifier has a nonlinear electrical response based on a tunnel effect.

4. The monolithic ROSA device of claim 1, further comprising coupling means configured to enable joining an optical concentrating device to the antenna.

5. A method for producing a monolithic Receiver Optical Sub-Assembly (ROSA) device that comprises at least one antenna, at least one rectifier and an amplifier, wherein the method comprises the steps of:
    (i) providing a first layer that comprises a plurality of amplifiers embedded onto a substrate;
    (ii) preparing a second layer that comprises a plurality of antennas and a plurality of rectifiers, each of the rectifiers is electrically connected to a respective amplifier to obtain a plurality of dies, wherein each die comprising an amplifier, a rectifier and at least one antenna coupled thereto, thereby obtaining a plurality of monolithic ROSA devices deposited on a substrate; and
    (iii) separating the plurality of ROSA devices deposited onto the substrate into individual monolithic ROSA devices.

6. The method of claim 5, further comprising a step of preparing a layer that comprises a plurality of optical concentrating devices, each configured to enable concentrating optical signals that are free spaced transmitted to one or more antennas, and wherein each of the plurality of optical concentrating devices is coupled to a respective antenna.

7. A monolithic ROSA device produced by the method claimed in claim 5.

* * * * *